Jan. 23, 1940. B. S. AIKMAN 2,187,926
LUBRICATED PLUG COCK
Filed May 29, 1937 2 Sheets-Sheet 1
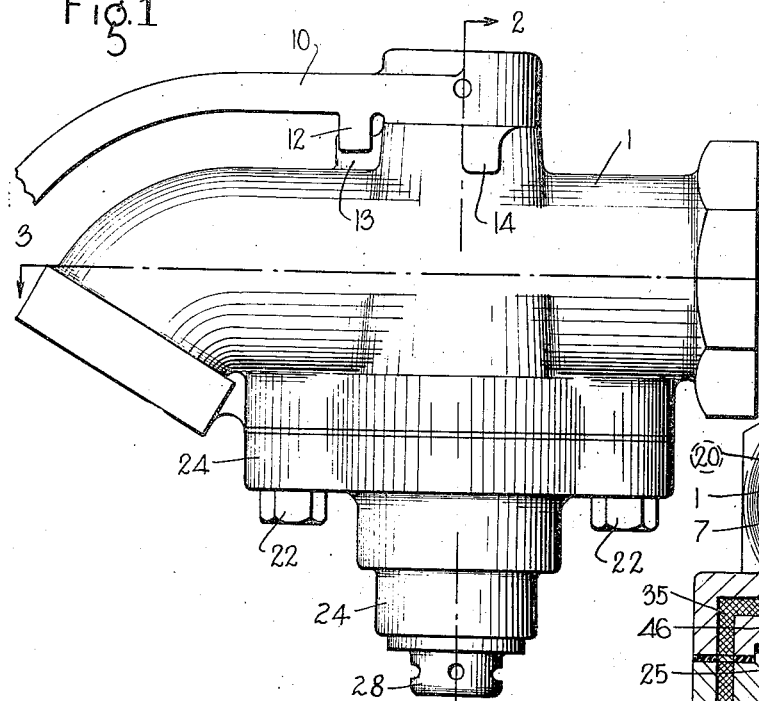
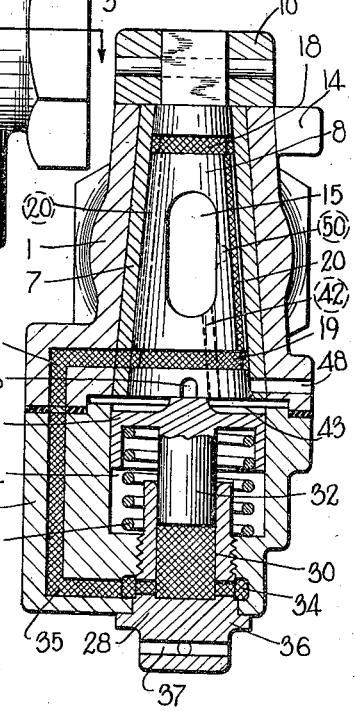
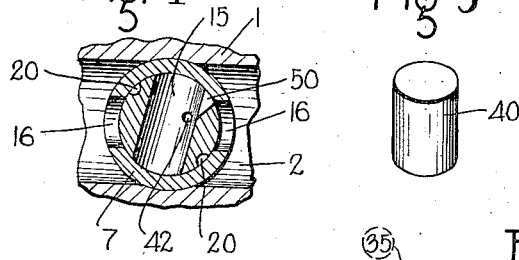
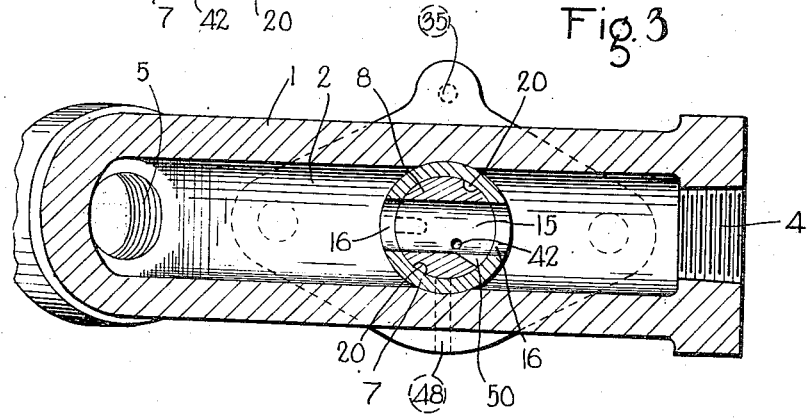
INVENTOR
BURTON S. AIKMAN
BY *Wm. M. Cady*
ATTORNEY Jan. 23, 1940.  B. S. AIKMAN  2,187,926

LUBRICATED PLUG COCK

Filed May 29, 1937  2 Sheets-Sheet 2

INVENTOR
BURTON S. AIKMAN
BY Wm. M. Cody
ATTORNEY

Patented Jan. 23, 1940

2,187,926

UNITED STATES PATENT OFFICE 2,187,926

LUBRICATED PLUG COCK

Burton S. Aikman, Wilkinsburg, Pa., assignor to The Westinghouse Air Brake Company, Wilmerding, Pa., a corporation of Pennsylvania Application May 29, 1937, Serial No. 145,529

20 Claims. (Cl. 251—93)

This invention relates to an improved valve device, and particularly to means for supplying lubricant to the engaging surfaces of a tapered plug valve and its seat.

The tapered plug valves employed in certain types of valve devices, such as the angle cocks employed in railway vehicle brake apparatus, are held against their seats by the fluid under pressure in the passages which they control. While the faces of these plug valves and their seats are lubricated when the angle cocks are initially assembled, this lubricant is soon consumed, leaving the surfaces dry, with the result that the plug valves are difficult to turn. As angle cocks are usually constructed, the plug valves are substantially entirely enclosed, and the faces of the plug valves and their seats cannot be lubricated from an external source without disassembling the angle cocks, and, as a result, the plug valves are not lubricated.

It is an object of this invention to provide an improved valve device employing a plug valve, and incorporating means for lubricating the face of the plug valve and of its seat.

A further object of the invention is to provide an improved valve device of the type described and incorporating a supply of lubricant, together with means responsive to movement of the plug valve between its open and closed positions for supplying lubricant from this lubricant supply to the face of the plug valve and to its seat.

Another object of the invention is to provide an improved valve device of the type described which is arranged so that the supply of lubricant can be quickly and easily replenished when desired.

A further object of the invention is to provide an automatically lubricated valve device of the type described, which is simple and rugged in construction, and which is positive in operation.

Another object of the invention is to provide lubricating means for a valve device of a type having a tapered plug valve, the lubricating means being arranged so that it will not interfere with movement of the plug valve.

A further object of the invention is to provide an improved valve device.

Figure 6:
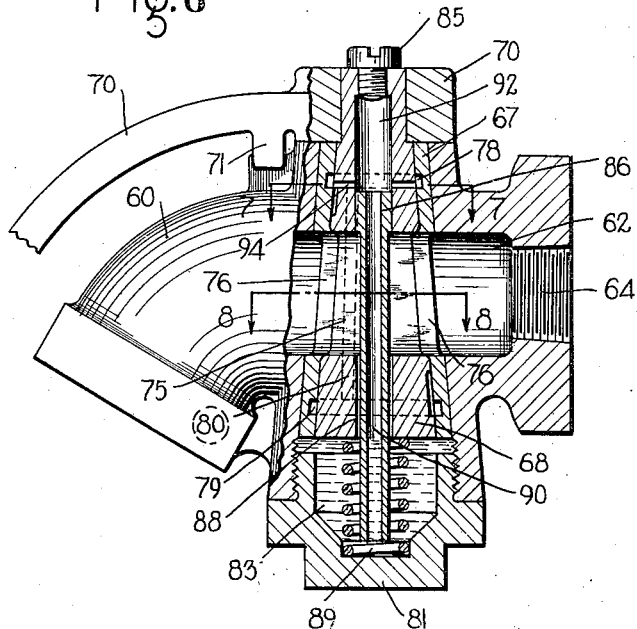
Figure 7:
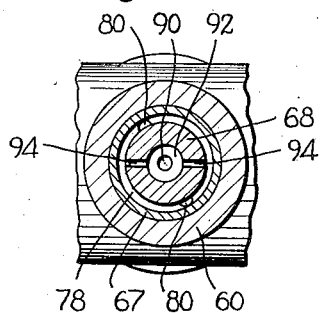
Figure 8:
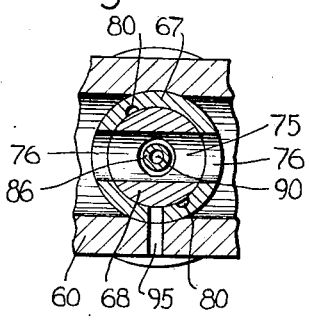

Other objects of the invention and features of novelty will be apparent from the following description taken in connection with the accompanying drawings, in which Fig. 1 is a side elevational view of a valve device embodying my invention, Fig. 2 is a sectional view taken substantially along the line 2—2 on Fig. 1, Fig. 3 is a sectional view taken substantially along the line 3—3 on Fig. 1, Fig. 4 is a fragmentary sectional view similar to Fig. 3, but showing the plug valve in a different position than that in which it is shown in Fig. 3, Fig. 5 is a perspective view of a lubricant cartridge employed in the valve device shown in Figs. 1 to 4, Fig. 6 is a view, largely in section, of a modified form of valve device embodying this invention, Fig. 7 is a sectional view taken substantially along the line 7—7 on Fig. 6, and Fig. 8 is a sectional view taken substantially along the line 8—8 on Fig. 6.

Referring to Figs. 1 to 4 of the drawings, there is shown therein a valve device embodying this invention. The valve device shown is in angle cock adapted to be applied to the opposite ends of the brake pipe of a vehicle fluid pressure brake equipment.

This valve device has a body 1 having a passage 2 extending therethrough, while the wall surrounding one end of this passage has threads, indicated at 4, formed therein and adapted to receive the threaded end of the brake pipe on a vehicle. The wall surrounding the other end of the passage 2 has threads 5 formed therein and adapted to receive the nipple associated with a flexible hose and coupling for establishing connection between the brake pipe on one car and the brake pipe on an adjacent car.

The body 1 has a tapered bore therein extending transversely of the passage 2, while a tapered bushing 7 is mounted in this bore. A tapered plug valve 8 is mounted in the bushing 7, and is adapted to seat upon the inner face of the bushing 7. The plug valve 8 is arranged in the body 1 so that the small end of the plug valve is located vertically above the larger end thereof, and so that the plug valve 8 is movable about a substantial vertical axis, while the small end of the plug valve 8 projects from the body 1, and has secured thereto a handle 10 by means of which the plug valve may be turned between its open and closed positions. The handle 10 has a lug 12 formed integral therewith and adapted to engage a lug 13 formed on the body 1 to limit movement of the handle, and thereby the plug valve 8 in one direction, while the handle lug 12 is also adapted to engage a lug or projection 14 on the body 1 to limit movement of the handle and of the plug valve 8 in the other direction.

The plug valve 8 has a port 15 extending therethrough, and adapted in one position of the plug valve to be in alignment with ports 16 in the bushing 7 so as to permit communication through the passage 2.

The plug valve 8 has formed therein adjacent the upper or small end thereof an annular groove 18, while the plug valve has formed therein adjacent the lower or large end thereof a similar groove 19. The grooves 18 and 19 are joined by lubricant distributing grooves 20 located on opposite sides of the plug valve 8.

The body 1 has detachably secured thereto by means of cap screws 22, a member 24 which has a bore therein which is open to the large end of the plug valve 8. A movable abutment in the form of a piston 25 is mounted in the bore in the member 24, and is yieldingly held against the large end of the plug valve 8 by means of a spring 26 which extends between the piston 25 and the end wall of the bore of the member 24.

The member 24 has a threaded opening therein located substantially axially of the bore in the member 24, while an element 28 is secured in this threaded opening. The element 28 extends within the spring 26, and has a bore therein, indicated at 30, which is adapted to receive a plunger 32 formed integral with the piston 25.

The bore 30 in the element 28 communicates through a plurality of radially extending passages at the lower end thereof with an annular groove 34 formed in the member 24, while the groove 34 is connected by way of a passage 35 with a port in the bushing 7 in alignment with the annular groove 19 in the plug valve 8.

The element 28 has a flange or shoulder 36 formed integral therewith and adapted to engage the face of the member 24 to prevent the escape of lubricant through the joint between the element 28 and the member 24, while the element 28 has a plurality of openings, indicated at 37, extending through the head thereof and adapted to receive a suitable tool, such as a spanner wrench, for tightening and removing the element 28.

The bore 30 in the element 28 is adapted to receive a quantity of suitable lubricant in the form of a cartridge, indicated at 40, and shown in Fig. 5 of the drawings. The lubricant cartridge 40 consists of a cylinder of a lubricant in substantially solid form, such as grease.

The plug valve 8 has a passage therein, indicated at 42, and communicating with the port 15 and with the pressure chamber 43 at the upper face of the piston 25, while the piston 25 is loosely fitted in the bore so as to permit fluid under pressure to flow at a restricted rate from the chamber 43 to the operating chamber 44 at the spring side thereof.

The plug valve 8 has a port 46 in the form of a groove in the face of the large end thereof, and which, in the open position of the plug valve 8, registers with a port or passage 48 through the bushing 7 and the body 1 to permit the escape of fluid from the pressure chamber 43 to the atmosphere.

The plug valve 8 has a notch or recess 50 formed therein in one side of the port 15, while this notch or recess is arranged to open to the port 16 in the bushing 7 adjacent the end of the passage 2 which is connected to the brake pipe before the port 15 permits flow of fluid through the passage 2 in the body 1.

In operation, assuming that the bore 30 in the element 28 and the connecting passages are filled with lubricant, that the end of the passage 2 surrounded by the threads 4 is connected to a pipe, such as a brake pipe, which is charged with fluid under pressure, and that the plug valve 8 is in the closed position so that the flow of fluid through the passage 2 is cut off, the port 46 in the plug valve 8 registers with the passage 48 with the result that the pressure chamber 43 at the upper side of the piston 25 is connected to atmosphere, while the spring 26 operates through the piston 25 to yieldingly press the plug valve 8 against its seat on the bushing 7.

If at this time the plug valve 8 is turned by the handle 10 from the closed position towards the open position, then on initial movement of the plug valve 8, the port 46 is moved out of registration with the passage 48, thereby cutting off communication between the pressure chamber 43 and the atmosphere. On slight further movement of the plug valve 8, the notch 50 is opened to a port 16 in the bushing 7 so that fluid under pressure supplied from the brake pipe, or other pipe to which the valve device is connected, flows to the port 15 in the plug valve 8. At this time the port 15 has not been moved to a position to permit the flow of fluid through the passage 2 in the body 1, and on the supply of fluid under pressure through the notch 50 to the port 15, fluid flows from the port 15 through the passage 42 to the pressure chamber 43 at the upper face of the piston 25. The volume of the chamber provided by the port 15, and of the pressure chamber 43 is relatively small, so that there will be a rapid increase in the pressure of the fluid in these chambers.

On an increase in the pressure of the fluid in the pressure chamber 43, the fluid under pressure operating on the large end of the plug valve 8 presses the plug valve 8 against its seat on the bushing 7, while the fluid under pressure in the chamber 43 also operates on the face of the piston 25 and exerts force thereon to move the piston against the spring 26, while the plunger 32 subjects the lubricant in the bore 30 to pressure. The pressure exerted on the lubricant in the bore 30 is transmitted through the passage 35 to the lubricant in the groove 19, and thus to the lubricant in the distributing grooves 20, and in the groove 18.

As a result of the pressure exerted on the lubricant in the grooves 18, 19 and 20, lubricant tends to flow therefrom, and presses against the inner face of the bushing 7 so that as the plug valve 8 is turned, lubricant is wiped across the seating face of the bushing 7 to maintain a film of lubricant between the face of the plug valve 8 and the bushing 7.

As the lubricant in the grooves 18, 19 and 20 is consumed, the piston 25 forces lubricant from the bore 30 through the passage 35 to maintain the pressure on the lubricant in the grooves 18, 19 and 20.

As the lubricant employed in this valve device is grease of substantially solid form, it will not flow freely, and considerable resistance to the flow of lubricant between the face of the plug valve 8 and the seating face of the bushing 7 will be developed. As a result sufficient back pressure will be quickly developed on the lubricant in the passage 35, and in the bore 30, to overcome the force exerted on the lubricant in the bore 30 by the piston 25, and accordingly the flow of lubricant to the grooves in the plug valve 8 will cease. This prevents too free supply of lubricant to the plug valve, with consequent waste of lubricant and depletion of the supply of lubricant contained in the valve device.

On the supply of fluid under pressure to the pressure chamber 43 at the upper face of the piston 25, fluid leaks past the piston 25 to the operating chamber 44 at the spring side of the piston 25, and gradually increases the pressure of the fluid therein. After a short time interval, the pressure of the fluid in the operating chamber 44 will have increased substantially to the pressure of the fluid in the chamber 43 at the opposite face of the piston 25, and the spring 26 will move the piston 25 into engagement with the large end of the plug valve 8, thereby relieving the pressure exerted by the plunger 32 upon the lubricant in the bore 30, and eliminating the possibility of a continued supply of lubricant from the bore 30 to the plug valve.

When the plug valve 8 is turned to the full open position, the port 15 is in alignment with the ports 16 in the bushing 7, substantially as shown in Fig. 3 of the drawings. At this time fluid under pressure present in the port 15 in the plug valve 7 flows to the passage 42 to the pressure chamber 43 at the face of the piston 25 so as to maintain the pressure of the fluid in this chamber.

On a subsequent movement of the plug valve 8 from the open position to the closed position, the plug valve is turned so that the port 15 no longer registers with the ports 16, thereby cutting off the flow of fluid through the passage 2, while the flow of fluid from the passage 2 to the port 15 is also cut off.

In addition, upon this movement of the plug valve 8, the port 46 is moved into alignment with the passage 48 to release the fluid under pressure present in the chamber 43 at the upper face of the piston 25, while fluid under pressure present in the chamber formed by the port 15 flows through the port 42 to the chamber 43 and thence to the atmosphere. On the reduction in the pressure of fluid in the chamber 43, the spring 26 operates through the piston 25 to yieldingly press the plug valve 8 to the seated position, while fluid under pressure present in the operating chamber 44 leaks past the piston 25 to the pressure chamber 43, and thence to the atmosphere by way of the port 46 and passage 48.

On a subsequent movement of the plug valve 8 from the closed position to the open position, fluid under pressure is again supplied from the port 15 in the plug valve 8 to the chamber 43 at the face of the piston 25 to cause this piston to exert pressure upon the lubricant in the bore 30 and in the passage 35, and thus cause lubricant to be supplied to the grooves 18, 19 and 20 in the plug valve 8 to replace that consumed during movement of the plug valve.

It will be seen that this valve device is arranged so that on movement of the plug valve from the closed position to the open position, fluid under pressure is supplied to the lubricant supply means on the initial movement of the plug valve before the flow of fluid is established through the passage controlled by the plug valve. The volume of the chambers associated with the lubricant supply means is relatively small, and the pressure of the fluid therein will build up very rapidly, and will reach a high value before the plug valve has been moved far enough to open communication through the passage 2 to the body 1.

As a result, relatively great force will be exerted by the piston 25 upon the lubricant in the bore 30, and a correspondingly high pressure will be developed therein, and this pressure will be transmitted to the lubricant in the grooves 18, 19 and 20 in the plug valve to insure that these grooves are completely filled with lubricant while the plug valve is being turned.

When the plug valve 8 is moved to the open position so that the port 15 permits flow of fluid from the portion of the passage 2 connected to the brake pipe to the portion of the passage 2 at the other side of the plug valve, there will be a reduction in the pressure of the fluid in the passage 2 because of the supply of fluid to the region of reduced pressure, and there will be a corresponding reduction in the pressure of the fluid in the chamber 43 at the face of the piston 25, and an accompanying reduction in the pressure exerted on the lubricant in the bore 30. However, this is without consequence as the grooves in the plug valve are filled with lubricant when the plug valve is first turned.

The valve device provided by this invention is arranged so that the supply of lubricant therein may be quickly and easily replenished when necessary. In order to replenish the lubricant supply, it is necessary only to remove the element 28, which may be done readily by means of a suitable tool operating in the holes 37.

When the element 28 is removed, the piston 25 is maintained in engagement with the large end of the plug valve 8 by the spring 26, while it will be seen that the spring 26 is not disturbed by removal of the element 28.

When the element 28 has been removed, a cartridge of lubricant, such as indicated at 40 in Fig. 5, is inserted in the bore 30 in the element 28, and the element 28 is replaced in the member 24 with the plunger 32 carried by the piston 25 extending into the bore 30.

In Figs. 6, 7 and 8 of the drawings, there is shown a modified form of valve device embodying my invention. The valve device shown in these figures of the drawings is an angle cock adapted to be employed in a vehicle fluid pressure brake equipment, and has a body 60 having a passage 62 extending therethrough, while the wall surrounding one end of the passage has threads 64 formed therein and adapted to receive the threaded end of the brake pipe on a vehicle. The wall surrounding the other end of the passage 62 has threads, not shown, formed therein and adapted to receive a nipple associated with a flexible hose and coupling for establishing connection between the brake pipe on adjacent cars of a train.

The body 60 has a tapered bore therein extending transversely of the passage 62, while a tapered bushing 67 is mounted in this bore. The bushing 67 has positioned therein a tapered plug valve 68 which is arranged to be movable about a generally vertical axis, while the small end of the plug valve is located vertically above the large end thereof.

The small end of the plug valve 68 projects from the body 60, and has secured thereon a handle 70 by means of which the plug valve may be turned between an open position and a closed position. The handle 70 has a lug 71 formed integral therewith and adapted to engage projections formed on the body 60 to limit movement of the handle 70 and of the plug valve 68 beyond the open and closed positions.

The plug valve 68 has a port 75 formed therein, which is adapted to register with ports 76 in the bushing 67 in one position of the plug valve, while in another position of the plug valve the flow of fluid through the port 75 is cut off.

The inner face of the bushing 67 has an annular groove 78 formed therein at a point adjacent the upper end thereof, while the bushing 67 also has formed therein adjacent the lower end thereof an annular groove 79. The grooves 78 and 79 are connected by axially extending lubricant distributing grooves 80.

The lower end of the bore in the body 60 in which the bushing 67 is mounted is closed by means of a threaded cap 81 which cooperates with the body 60 to provide a lubricant chamber 83 at the large end of the plug valve 68.

The plug valve 68 has an axial bore extending therethrough, while the upper end of this bore is closed by means of a screw 85. A tube 86 is secured in the bore in the plug valve 68, and has a reduced portion which extends through the portion of the bore below the port 75, leaving a restricted space indicated at 88 between the tube and the face of the bore. The tube 86 extends substantially to the lower end of the lubricant chamber 83, while a spring 89 surrounds the lower end of the tube and extends between the cap 81 and the large end of the plug valve 68 and yieldingly presses the plug valve 68 against its seat on the bushing 67.

The tube 86 has a passage 90 therein which communicates with the lower portion of the lubricant chamber 83, and with a lubricant distributing chamber 92 formed by the upper portion of the bore in the plug valve 68. The chamber 92 communicates through a plurality of radially extending passages 94 with the annular groove 78 in the inner face of the bushing 67.

In operation, assuming that the lubricant chamber 83 is filled with suitable lubricant in liquid form, that the end of the passage 62 surrounded by the threads 64 is connected to a pipe, such as a brake pipe, which is charged with fluid under pressure, and that the plug valve 68 is in the closed position so that the flow of fluid through the passage 62 is cut off, the supply of fluid to the port 75 in the plug valve 68 is cut off, while the port 75 is open to a passage 95 extending through the bushing 67 and the body 60 and open to the atmosphere. As a result the fluid in the chamber formed by the port 75 will be at atmospheric pressure, while the lubricant chamber 83 and the chamber 92, which communicate with the chamber provided by the port 75, will also be at atmospheric pressure.

On movement of the plug valve 68 from the closed position to the open position, fluid under pressure flows from the portion of the passage 62 at one side of the plug valve 68 to the port 75 in the plug valve 68, and thence to the portion of the passage 62 at the other side of the plug valve 68, while fluid supplied to the port 75 flows through the space 88 between the lower end of the tube 86 and the face of the bore in the plug valve 68, and increases the pressure of the fluid in the lubricant chamber 83 above the lubricant contained therein. On an increase in the pressure exerted on the lubricant 83, lubricant flows upwardly in the passage 90 through the tube 86 to the lubricant distributing chamber 92, from which it flows by way of the passages 94 to the groove 78, and thence by gravity through the lubricant distributing grooves 80 to the lower annular groove 79 to fill these grooves with liquid lubricant.

On upward flow of lubricant through the passage 90 and the tube 86, there is an increase in the pressure of the fluid contained in the upper portion of the lubricant distributing chamber 92. When a predetermined amount of lubricant has been supplied to the passage 90 in the tube 86 and to the chamber 92, the pressure of the fluid in the upper part in the chamber 92 will equalize with the pressure of the fluid in the chamber 83 above the lubricant present therein, and further flow of lubricant to the chamber 92 will be cut off.

The various parts of the valve device are arranged and proportioned so that the pressure of the fluid in the lubricant distributing chamber 92 will not equalize with the pressure of the fluid in the chamber 83 above the lubricant contained therein, until sufficient lubricant has been supplied to the passage 90 to cause lubricant to reach the chamber 92, and flow through the passages 94 to the lubricant distributing grooves.

The lubricant supplied to the lubricant distributing grooves will coat the face of the plug valve 68, with the result that when the plug valve is turned, this lubricant will form a film between the face of the plug valve 68 and the seating face on the bushing 67.

On subsequent movement of the plug valve 68 from the open position to the closed position, the supply of fluid from the passage 62 to the port 75 is cut off, while the port 75 registers with the passage 95 with the result that the fluid under pressure present in the chamber provided by the port 75, and in the connecting chambers, is released to the atmosphere.

On the consequent reduction in the pressure of the fluid at the upper face of the lubricant contained in the chamber 83, the fluid under pressure present in the upper part of the chamber 92 expands, and forces the lubricant in the passage 90 downwardly. The lubricant which has been supplied to the lubricant distributing grooves, however, remains therein.

On a subsequent movement of the plug valve 68 from the closed position to the open position, fluid under pressure flows to the chamber 83 to cause lubricant to again flow to the passage 90 and reach the chamber 92, from which it is supplied to the lubricant distributing grooves, as explained above.

The valve device shown in Figs. 6 to 8 of the drawings is arranged so that the lubricant supply may be quickly and easily replenished when desired. In order to replenish the lubricant supply it is only necessary to remove the screw 85, and supply lubricant to the chamber 92, from which it flows by way of the passage 90 to the chamber 83. When the supply of lubricant is restored, the screw 85 is replaced.

It will be seen that each of the valve devices provided by this invention incorporates means to automatically supply lubricant from a lubricant source to the portions of the valve device to be lubricated, and that the supply of lubricant is effected each time the plug valve of the valve device is turned between the open and closed positions.

While two embodiments of the improved lubricated plug valve or valve device provided by my invention have been illustrated and described in detail, it should be understood that the invention is not limited to these details of construction, nor is the invention limited to that form of valve device known as an angle cock, and that numerous changes and modifications may be made without departing from the scope of the following claims.

Having now described my invention, what I claim as new and desire to secure by Letters Patent, is:

1. The combination with a valve device comprising a body and a valve mounted in said body and movable to an open position for permitting the supply of fluid under pressure therethrough, of a chamber associated with said valve device and containing a supply of lubricant, means for supplying lubricant from said chamber to lubricate said valve upon subjecting the lubricant in the chamber to pressure, and means for subjecting the lubricant in the chamber to pressure upon movement of the valve to its open position and upon movement of the valve to its closed position to release the pressure exerted on said lubricant.

2. The combination with a valve device comprising a body and a valve mounted in said body and movable to an open position for permitting the supply of fluid under pressure therethrough, of a chamber associated with said valve device and containing a supply of lubricant, means for supplying lubricant from said chamber to lubricate said valve upon subjecting the lubricant in the chamber to pressure, a piston operable by fluid under pressure for subjecting the lubricant in the chamber to pressure, and means for supplying fluid under pressure to said piston upon movement of said valve to its open position, said means being operable on movement of said valve to its closed position to release the fluid under pressure supplied to said piston.

3. The combination with a valve device comprising a body and a valve mounted in said body and movable to an open position for permitting the supply of fluid under pressure therethrough, of a chamber associated with said valve device and containing a supply of lubricant, means for supplying lubricant from said chamber to lubricate said valve upon subjecting the lubricant in the chamber to pressure, and means for subjecting the lubricant in said chamber to fluid under pressure upon movement of said valve to its open position and upon movement of the valve to its open position to release the fluid under pressure exerting force on the lubricant to thereby remove the force exerted on the lubricant.

4. In a device of the class described, in combination, a body having a passage extending therethrough, a plug valve associated with said body, said plug valve having a port extending therethrough and being movable relative to the body for controlling flow of fluid through said passage, one of the engaging surfaces of the plug valve and of the body being provided with a lubricant distributing groove, supply means operative on the supply of fluid under pressure thereto to supply lubricant to said lubricant groove, and means for supplying fluid under pressure to said supply means from the port in said plug valve and upon movement of the valve to its open position to release the fluid under pressure exerting force on the lubricant to thereby remove the force exerted on the lubricant.

5. In a device of the class described, in combination, a body having a passage extending therethrough, a plug valve associated with said body, said plug valve having a port extending therethrough and being movable relative to the body for controlling flow of fluid through said passage, one of the engaging surfaces of the plug valve and of the body being provided with a lubricant distributing groove, supply means operative on the supply of fluid under pressure thereto to supply lubricant to said lubricant groove, and means controlled by said plug valve for supplying fluid under pressure to said supply means and for releasing fluid from said supply means.

6. In a device of the class described, in combination, a body having a passage therethrough, a tapered plug valve mounted in said body and movable relative thereto about a generally vertical axis for controlling communication through said passage, the small end of said plug valve being disposed above the large end thereof and projecting from the body to provide means for turning said plug valve, one of the engaging surfaces of the plug valve and of the body being provided with a lubricant distributing groove, the body having a chamber associated therewith disposed at the large end of said plug valve in axial alignment therewith, said chamber being adapted to contain a quantity of lubricant, supply means associated with said chamber and operated on the supply of fluid under pressure thereto to supply lubricant from said chamber to said lubricant distributing groove, and means controlled by said plug valve for supply fluid to said supply means and for releasing fluid from said supply means.

7. In a device of the class described, in combination, a body having a passage therethrough, a tapered plug valve mounted in said body, said plug valve having a port therethrough and being movable relative to said body about a generally vertical axis for controlling communication through said passage, the small end of said plug valve being disposed above the large end thereof and projecting from the body to provide means for turning said plug valve, one of the engaging surfaces of the plug valve and of the body being provided with a lubricant distributing groove, the body having a chamber associated therewith disposed at the large end of said plug valve in axal alignment therewith, said chamber being adapted to contain a quantity of lubricant, supply means associated with said chamber and operated on the supply of fluid under pressure thereto to supply lubricant from said chamber to said lubricant distributing groove, a communication for supplying fluid from the port in said plug valve to said supply means, and a communication controlled by said plug valve and through which fluid is released from said supply means in the closed position of the plug valve.

8. In a device of the class described, in combination, a body having a passage therethrough, a plug valve associated with said body and being movable relative thereto for controlling the flow of fluid through said passage, one of the engaging surfaces of the plug valve and of the body being provided with a lubricant distributing groove, a lubricant chamber associated with said body and communicating with said lubricant distributing groove, said chamber being adapted to contain a quantity of lubricant, a movable abutment associated with said body and operated on an increase in the pressure of the fluid in a pressure chamber at one face thereof to subject the lubricant in said lubricant chamber to pressure, and means controlled by said plug valve for supplying fluid under pressure to and for releasing fluid under pressure from said pressure chamber.

9. In a device of the class described, in combination, a body having a passage therethrough, a plug valve associated with said body and being movable relative thereto for controlling the flow of fluid through said passage, one of the engaging surfaces of the plug valve and of the body being provided with a lubricant distributing groove, a lubricant chamber associated with said body and communicating with said lubricant distributing groove, said chamber being adapted to contain a quantity of lubricant, a movable abutment associated with said body and operated on an increase in the pressure of the fluid in a pressure chamber at one face thereof to subject the lubricant in said lubricant chamber to pressure, means controlled by said plug valve for supplying fluid under pressure to and for releasing fluid under pressure from said pressure chamber, and a spring operating through said abutment for yieldingly pressing said plug valve against its seat, said spring also yieldingly opposing movement of said abutment by fluid in said pressure chamber.

10. In a device of the class described, in combination, a body having a passage therethrough, a plug valve associated with said body and being movable relative thereto for controlling the flow of fluid through said passage, one of the engaging surfaces of the plug valve and of the body being provided with a lubricant distributing groove, a lubricant chamber associated with said body and communicating with said lubricant distributing groove, said chamber being adapted to contain a quantity of lubricant, means including a movable abutment for acting on the lubricant in said lubricant chamber and subject to the opposing pressures of the fluid in an operating chamber and of the fluid in a pressure chamber and operated on an increase in the pressure of the fluid in the pressure chamber to subject the lubricant in the lubricant chamber to pressure, means controlled by the plug valve for supplying fluid under pressure to the pressure chamber, and means for supplying fluid from the pressure chamber to the operating chamber at a restricted rate.

11. In a device of the class described, in combination, a body having a passage therethrough, a plug valve associated with said body, said plug valve having a port extending therethrough and being movable relative to said body for controlling the flow of fluid through said passage, one of the engaging faces of the plug valve and of the body being provided with a lubricant distributing groove, a lubricant chamber associated with said body and communicating with said lubricant distributing groove, said chamber being adapted to contain a quantity of lubricant, a movable abutment associated with said body and operated on an increase in the pressure of the fluid in a pressure chamber at one face thereof to subject the lubricant in said lubricant chamber to pressure, means for supplying fluid under pressure from the port in said plug valve to said pressure chamber, and a passage independent of the port in said valve and controlled by said valve for releasing fluid from said pressure chamber.

12. In a device of the class described, in combination, a body having a passage therethrough, a ported plug valve associated with said body and being movable relative thereto for controlling the flow of fluid through said passage, one of the engaging surfaces of the plug valve and of the body being provided with a lubricant distributing groove, a lubricant chamber associated with said body and communicating with said lubricant distributing groove, said chamber being adapted to contain a quantity of lubricant, means including a movable abutment for acting on the lubricant in said lubricant chamber and subject to the opposing pressures of the fluid in an operating chamber and of the fluid in a pressure chamber and operated on an increase in the pressure of the fluid in the pressure chamber to subject the lubricant in the lubricant chamber to pressure, means for supplying fluid under pressure from the port in said plug valve to said pressure chamber, a passage independent of said port and controlled by said plug valve for releasing fluid from said pressure chamber, and means for supplying fluid from the pressure chamber to the operating chamber at a restricted rate.

13. In a device of the class described, in combination, a body having a passage therethrough, a plug valve associated with said body for controlling flow of fluid through said passage, said plug valve having a port therethrough and being movable relative to said body between a closed position and an open position, one of the engaging faces of the plug valve and the body having a lubricant distributing groove therein, a chamber associated with said body and communicating with said lubricant distributing groove, said chamber being adapted to contain a quantity of lubricant, a movable abutment operated on an increase in the pressure of the fluid in a pressure chamber at one face thereof to subject the lubricant in said lubricant chamber to pressure, and means operated on movement of the plug valve from the closed position towards the open position to supply fluid to said pressure chamber before the plug valve is moved to a position in which the port therein permits flow of fluid through the passage in said body.

14. In a device of the class described, in combination, a body having a passage therethrough, a plug valve associated with said body for controlling flow of fluid through said passage, said plug valve having a port therethrough and being movable relative to said body between a closed position and an open position, one of the engaging faces of the plug valve and the body having a lubricant distributing groove therein, a chamber associated with said body and communicating with said lubricant distributing groove, said chamber being adapted to contain a quantity of lubricant, a movable abutment operated on an increase in the pressure of the fluid in a pressure chamber at one face thereof to subject the lubricant in said lubricant chamber to pressure, means operative in the closed position of the plug valve to release fluid from said operating chamber, and means operated on movement of the plug valve from the closed position towards the open position to supply fluid to said pressure chamber before the plug valve is moved to a position in which the port therein permits flow to the passage in said body.

15. In a device of the class described, in combination, a body having a passage therethrough, a tapered plug valve mounted in said body and movable relative thereto about an axis, one of the engaging surfaces of the plug valve and of the body and being provided with a lubricant distributing groove, a member associated with said body and having a bore therein, a piston reciprocable in said bore and carrying a plunger, an element detachably secured to said member and adapted to be removed from and secured thereto from the exterior of said member, said element having a bore therein adapted to receive the end of said plunger, the bore in said element being adapted to contain a quantity of lubricant and being in communication with the lubricant distributing groove, and means controlled by said plug valve for supplying fluid under pressure to the chamber at one face of said piston.

16. In a device of the class described, in combination, a body having a passage therethrough, a tapered plug valve mounted in said body and movable relative thereto about a substantially vertical axis for controlling flow of fluid through said passage, the small end of the plug valve being located above the larger end thereof and projecting from the body and providing means by which the plug valve may be turned, the body having a lubricant containing chamber therein at the larger end of the plug valve, the device also having a lubricant distributing chamber associated therewith and disposed adjacent the upper end of the plug valve, said lubricant distributing chamber being adapted to hold a quantity of lubricant, one of the engaging surfaces of the plug valve and of the body having a lubricant distributing groove therein communicating with said lubricant distributing chamber, a communication between said lubricant distributing chamber and the lower portion of said lubricant chamber, and means controlled by said plug valve for supplying fluid under pressure to said lubricant containing chamber to thereby cause lubricant to flow from said lubricant containing chamber to said lubricant distributing chamber, and for releasing fluid under pressure from said lubricant chamber.

17. In a device of the class described, in combination, a body having a passage therethrough, a tapered plug valve mounted in said body and movable relative thereto about a substantially vertical axis for controlling flow of fluid through said passage, the small end of the plug valve being located above the large end thereof and projecting from the body and providing means by which the plug valve may be turned, the body having a lubricant containing chamber therein at the large end of the plug valve, the device having a lubricant distributing chamber associated therewith and disposed adjacent the upper end of the plug valve, said lubricant distributing chamber being adapted to hold a quantity of lubricant, one of the engaging surfaces of the plug valve and of the body having a lubricant distributing groove therein, a passage through which lubricant supplied to said lubricant distributing chamber may flow by gravity to the distributing groove, a communication between said lubricant distributing chamber and the lower portion of said lubricant containing chamber, and means controlled by said plug valve for supplying fluid under pressure to said lubricant containing chamber to thereby cause lubricant to flow from said lubricant containing chamber to said lubricant distributing chamber, for releasing fluid under pressure from said lubricant chamber.

18. In a device of the class described, in combination, a body having a passage therethrough, a tapered plug valve mounted in said body and movable relative thereto about a substantially vertical axis for controlling flow of fluid through said passage, the small end of the plug valve being located above the larger end thereof and projecting from the body and providing means by which the plug valve may be turned, the body having a lubricant containing chamber therein at the large end of the plug valve, the plug valve having a lubricant distributing chamber therein adjacent the upper end thereof, said lubricant distributing chamber being adapted to hold a quantity of lubricant, one of the engaging surfaces of the plug valve and of the body having a lubricant distributing groove therein communicating with the lubricant distributing chamber and to which lubricant flows by gravity from the lubricant distributing chamber, a communication between said lubricant distributing chamber and the lower portion of said lubricant containing chamber, and means controlled by said plug valve for supplying fluid under pressure to said lubricant containing chamber to thereby cause lubricant to flow from said lubricant containing chamber to said lubricant distributing chamber, for releasing fluid under pressure from said lubricant chamber.

19. In a device of the class described, in combination, a body having a passage therethrough, a tapered plug valve mounted in said body and movable relative thereto about a substantially vertical axis for controlling flow of fluid through said passage, the small end of the plug valve being located above the large end thereof and projecting from the body and providing means by which the plug valve may be turned, the body having a lubricant containing chamber therein at the larger end of the plug valve, the plug valve having a lubricant distributing chamber therein adjacent the upper end thereof, said lubricant distributing chamber being adapted to hold a quantity of lubricant, one of the engaging surfaces of the plug valve and of the body having a lubricant distributing groove therein communicating with the lubricant distributing chamber, a communication between said lubricant distributing chamber and the lower portion of said lubricant containing chamber, means controlled by the plug valve for supplying fluid under pressure to said lubricant containing chamber to thereby cause pressure to be exerted on lubricant therein and thus cause lubricant to flow from said lubricant containing chamber to said lubricant distributing chamber, and for releasing fluid under pressure from said lubricant chamber, a filler opening in the small end of the plug valve through which lubricant may be supplied to said lubricant distributing chamber and thereby to the lubricant containing chamber, and means for closing said opening.

20. In a device of the class described, in combination, a body having a passage therethrough, a tapered plug valve mounted in said body and movable relative thereto about a substantially vertical axis for controlling flow of fluid through said passage, the small end of the plug valve being located above the large end thereof and projecting from the body and providing means by which the plug valve may be turned, the body having a lubricant containing chamber therein at the large end of the plug valve, the plug valve having a lubricant distributing chamber therein adjacent the upper end thereof, said lubricant distributing chamber being adapted to hold a quantity of lubricant, one of the engaging surfaces of the plug valve and of the body having a lubricant distributing groove therein communicating with the lubricant distributing chamber, a communication between said lubricant distributing chamber and the lower portion of said lubricant containing chamber, means controlled by said plug valve for supplying fluid under pressure to said lubricant containing chamber to thereby cause lubricant to flow from said lubricant containing chamber to said lubricant distributing chamber, and means controlled by said plug valve for releasing fluid under pressure from said lubricant chamber.

BURTON S. AIKMAN.